United States Patent
Fan et al.

(10) Patent No.: US 8,728,501 B2
(45) Date of Patent: May 20, 2014

(54) COMPOSITE MATERIAL OF INORGANIC NONMETALLIC MINERAL LOADED WITH TITANIA LAYER, PREPARATION PROCESS AND USE THEREOF

(75) Inventors: Li Fan, Shanghai (CN); Xiaojun Xu, Shanghai (CN)

(73) Assignee: Shanghai World-Prospect Chemtech Co., Ltd., Shanghai (CN)

( * ) Notice: Subject to any disclaimer, the term of this patent is extended or adjusted under 35 U.S.C. 154(b) by 0 days.

(21) Appl. No.: 13/393,533

(22) PCT Filed: Aug. 31, 2011

(86) PCT No.: PCT/CN2011/001469
§ 371 (c)(1),
(2), (4) Date: Feb. 29, 2012

(87) PCT Pub. No.: WO2013/029203
PCT Pub. Date: Mar. 7, 2013

(65) Prior Publication Data
US 2013/0052243 A1 Feb. 28, 2013

(51) Int. Cl.
*A61K 8/02* (2006.01)
*A01N 25/00* (2006.01)

(52) U.S. Cl.
USPC .......................................... 424/401; 424/405

(58) Field of Classification Search
USPC ................................. 424/401, 405
See application file for complete search history.

(56) References Cited

U.S. PATENT DOCUMENTS

| 4,009,139 | A * | 2/1977 | Widder et al. ................. 524/460 |
| 7,001,589 | B2 * | 2/2006 | Mondain-Monval et al. ........................... 424/9.52 |
| 2001/0018163 | A1 * | 8/2001 | Hirosaki et al. ............ 430/270.1 |

FOREIGN PATENT DOCUMENTS

| CN | 101676031 A | 3/2010 |
| CN | 101676214 A | 3/2010 |

OTHER PUBLICATIONS

CN1724145, Machine Translation, 2006.*
CN1563183, Machine Translation, 2005.*
Jiang Wang et al., CN1724145, 2006, Human Translation.*
International Preliminary Report on Patentability dated Mar. 4, 2014, in International Patent Appl. No. PCT/CN2011/001469 filed Aug. 31, 2011.

* cited by examiner

*Primary Examiner* — Blessing M Fubara
*Assistant Examiner* — Jennifer A Berrios
(74) *Attorney, Agent, or Firm* — Vierra Magen Marcus LLP

(57) ABSTRACT

The invention discloses composite materials, comprising an inorganic nonmetallic mineral as a support and a nanotitania layer loaded on the support, wherein the layer is comprised of a plurality of titania nanospheres, and the titania nanosphere is comprised of a plurality of nanotitania single particles. The invention also discloses composite materials further comprising one or more functional layers loaded on the nanotitania layer. The above composite materials may not only take advantage of the high refractive index and the high covering power of the nanotitania layer, but also make use of the good photocatalytic activity of the small single nanoparticles. Furthermore, the composite materials can be more readily coated by other functional layer(s) to prepare functionally strengthened or multi-functional composite materials. The invention also discloses methods for preparing the composite materials. The composite materials may be used as an additive with good compatibility in various industrial fields.

36 Claims, 3 Drawing Sheets

COMPOSITE MATERIAL OF INORGANIC NONMETALLIC MINERAL LOADED WITH TITANIA LAYER, PREPARATION PROCESS AND USE THEREOF

TECHNICAL FIELD

The invention relates to composite materials of inorganic nonmetallic mineral loaded with a titania layer, preparation methods and use of said composite material. The invention further relates to composite materials of inorganic nonmetallic mineral loaded with a titania layer and one or more functional layers, preparation methods and use thereof.

BACKGROUND ART

Titania is an important chemical material that is intimately relevant to our life. When its particle size is reduced to nanoscale, its nano-structure is so peculiar that it is imparted with superior properties of UV absorption and photocatalysis. Therefore, it has been a focus of research in recent 20 years. However, when nanotitania is used in coatings, plastics, paper, rubbers, environmental treatment and like applications, it can only exist in the form of microscale agglomerates in these application systems due to its relatively large specific surface energy, unable to achieve genuine nanoscale dispersion, thus its nanoscale performance can not be sufficiently displayed.

A core problem in current technology for preparing nanomaterial is how to prevent nanoparticles from agglomerating, so as to make efficient use of the excellent properties of nanomaterial. It is proposed to prepare micro-nano composite functional materials by selection of appropriate microscale supports to load nanomaterials. In CN1563183A to Wang Xiangtian, et al., an inorganic antimicrobial micropowdery composite of nanotitania-coated silica is prepared by using an Tetrabutyl titanate as titanium source in a mixture system of ethanol and acetic acid, and is further added into ABS resin to prepare an antimicrobial polymer article. In CN101077792A of Zhi Jinfang, orthotitanic acid was used as titanium source and dissolved by hydrogen peroxide in a sol-gel method to prepare a sol-gel, and polystyrene surface was coated with the nanotitania to prepare a core-shell micro-nano composite material. In CN101475215A of Hua Dong, et al., titanium tetrachloride or titanium sulfate was added dropwise into a suspension of barium sulfate or strontium sulfate, and was hydrolyzed directly so as to coat titania hydrate on the surface of barium sulfate and strontium sulfate, then the product was calcined and dehydrated at high temperature to obtain composite titania. In CN1724145A of Wang Jing, et al., a method was proposed in which a photocatalytically functional powder of nanotitania loaded on zeolite surface was prepared via impregnation and calcination with zeolite as the support and soluble titanium salt as the titanium source. In CN101108335 to Guo Li, et al., a photocatalytic material of nanotitania loaded argil was obtained by preparing clear nanotitania gel from butyl titanate as titanium source and then mixing the clear gel with argil, followed by water washing, drying and calcination. In CN101757937 to Chen Ruoyu, et al., an intercalated photocatalytic composite material was prepared by intercalation of nanotitania into zirconium phosphate layers. In CN101293754A of Liu Xiaohua, a titanium white composite material was prepared by loading nanotitania on the surface of silica micropowder. In patent US20100298484 to Allen, et al., an opaque pigment was prepared by loading titania on the surface of an acid resistant high molecular polymer. In patent US20100247915 to Furukawad, et al., a functional composite was prepared by loading nanotitania on TiN surface in oxygen atmosphere at high temperature.

The above patents and references have reported some beneficial explorations in the preparation of functional composite powder by loading nanotitania on a microscale support. However, these technologies still encounter the following problems in general:

1. Preparation is effected with complex processes at high cost. For example, crystalline transition via calcination at high temperature or reaction in oxygen atmosphere at high temperature is required in the methods such as sol-gel method with titanate or orthotitanic acid, etc. as titanium source, impregnation-calcination method with soluble titanium salt as titanium source loaded directly on microscale support, and the method for preparing micro-nano composite material of loaded nanotitania in oxygen atmosphere at high temperature. Therefore, these methods are all subjected to the problems of high cost, complex process and demanding equipments.

2. In such existing methods, the loading rate (or coating rate) of nanotitania is affected by many factors, and the loading rate is rather low or the loading firmness is inadequate. Whether microscale support and nanotitania loaded thereon can form a firm combination is limited by a lot of reaction conditions. For example, when inorganic hydrolysis precipitation reaction—thermal crystallization process is used to prepare a composite material from water soluble titanium salt as titanium source, the process is impacted by a number of factors such as pH, impurity ions, temperature, support and the like, and what is obtained is usually a mixture of free nanotitania, free support and support with nanotitania thereon. Alternatively, a composite of nanotitania and support, such as pearlescent mica, may be prepared under particular conditions. However, the titania layer can not be firmly loaded on the support layer, and nanotitania tends to scale off easily from the support after the composite is dispersed under high speed.

The patent applications CN101676030A and CN101676031A of FAN Li, who is also the inventor of the present application have disclosed a process without high temperature calcination, involving double hydrolysis of titanium tetrachloride under synergistic effect of hydrochloric acid and a high molecular compound, and coating of acid resistant nonmetallic mineral surface with nanotitania layer. In this process, since the growth of nanoparticles is inhibited by hydrochloric acid during hydrolysis of titanium tetrachloride, the particle size of the resultant titania nanoparticles is predominantly not more than 10 nm. Thus, nanotitania is highly transparent, and the behavior of high refractive index and high covering power of titania is restricted.

SUMMARY OF THE INVENTION

One object of the invention is to provide composite materials of a nanotitania layer loaded on an inorganic nonmetallic mineral support.

Another object of the invention is to provide methods for preparing composite materials of a nanotitania layer loaded on an inorganic nonmetallic mineral support with a simple process at low cost.

Still another object of the invention is to provide compositions comprising one or more composite materials of a nanotitania layer loaded on an inorganic nonmetallic mineral support.

Yet another object of the invention is to provide use of composite materials of a nanotitania layer loaded on an inorganic nonmetallic mineral support.

According to the first aspect of the invention, there is provided a composite material comprising an inorganic nonmetallic mineral as a support and a nanotitania layer loaded on the support, wherein the nanotitania layer is comprised of a plurality of titania nanospheres, and the titania nanosphere is comprised of a plurality of nanotitania single particles.

The invention also provides a composite material comprising an inorganic nonmetallic mineral as a support, a nanotitania layer loaded on the support, and one or more functional layers loaded on the nanotitania layer, wherein the nanotitania layer is comprised of a plurality of titania nanospheres, and the titania nanosphere is comprised of a plurality of nanotitania single particles.

In the above composite materials, the inorganic nonmetallic mineral used as the support is acid resistant.

In the above composite materials, the inorganic nonmetallic mineral used as the support is one or more material(s) selected from the group consisting of kaolin, mica, talc powder, barium sulfate, diatomite, bentonite, montmorillonite, white carbon black, wollastonite, zeolite, sepiolite, attapulgite, and magnetite.

In the above composite materials, the particle size of the inorganic nonmetallic mineral used as the support is in the range of 0.2-100 μm.

In the above composite materials, the particle size of the inorganic nonmetallic mineral used as the support is in the range of 1-40 μm.

In the above composite materials, the diameter of the nanotitania single particle is in the range of 1-20 nm, and the diameter of the titania nanosphere is two (2) to one hundred (100) times that of the nanotitania single particle.

In the above composite materials, the diameter of the nanotitania single particle is in the range of 2-10 nm, and the diameter of the titania nanospheres is five (5) to fifty (50) times that of the nanotitania single particle.

In the above composite materials, the loading amount of the nanotitania layer is 1-50% by weight of the inorganic nonmetallic mineral support layer.

In the above composite materials, the loading amount of the nanotitania layer is preferably 5-30% by weight of the inorganic nonmetallic mineral support layer.

In the above composite materials, the loading amount of the nanotitania layer is more preferably 5-20% by weight of the inorganic nonmetallic mineral support layer.

In the above composite materials, the loading amount of the functional layer is 0.1-20% by weight of the inorganic nonmetallic mineral support layer.

In the above composite materials, the nanotitania layer is loaded firmly onto the inorganic nonmetallic mineral support.

In the above composite materials, the load firmness of the nanotitania layer on the inorganic nonmetallic mineral support may be verified by using the following procedure: a 5% suspension of 1 g of the composite material in 20 g ethanol is prepared, dispersed for 4 hours by using a high speed dispersing homogenizer at 10000 rpm, then diluted with ethanol to 0.05% in concentration. 0.02 ml of the diluted suspension is sampled, and examined by using a transmission electron microscope. An area in which distinct particles are concentrated while distributed evenly is selected to take TEM images at 5000× and 20000× magnifications respectively. It can be seen from the TEM images that no free titania nanosphere is observed after the composite material has been dispersed using the high speed dispersing homogenizer.

In the above composite materials, the functional layer is one or more layer(s) selected from the group consisting of UV shielding protective layer, flame resistant layer, photocatalytic enhancing layer, antimicrobial layer and photocatalytic-antimicrobial enhancing layer.

The UV shielding protective layer comprises one or more oxides selected from the group consisting of silica, hydrated silica, alumina, hydrated alumina and zirconia.

The flame resistant layer comprises magnesium hydroxide.

The photocatalytic enhancing layer comprises zinc oxide.

The antimicrobial layer comprises silver salt.

The photocatalytic-antimicrobial enhancing layer comprises zinc oxide and silver salt.

The silver salt is selected from the group consisting of silver chloride or silver phosphate.

According to the second aspect of the invention, there is provided a method for preparing a composite material comprising an inorganic nonmetallic mineral as a support and a nanotitania layer loaded on the support, wherein the method comprises the following steps:

preparing a dispersed suspension of an inorganic nonmetallic mineral used as a support material in the presence of water, an inorganic acid and a first dispersant, preparing a hydrolyzed solution of titanium tetrachloride in the presence of water and a second dispersant; and mixing the dispersed suspension of the inorganic nonmetallic mineral with the hydrolyzed solution of titanium tetrachloride to allow them to react completely to obtain the composite material as described above.

The invention further provides a method for preparing a composite material comprising an inorganic nonmetallic mineral as a support, a nanotitania layer loaded on the support, and one or more functional layers loaded on the nanotitania layer, wherein the method comprises the following steps:

(1) preparing a dispersed suspension of an inorganic nonmetallic mineral used as a support material in the presence of water, an inorganic acid and a first dispersant, preparing a hydrolyzed solution of titanium tetrachloride in the presence of water and a second dispersant, and mixing the dispersed suspension of the inorganic nonmetallic mineral with the hydrolyzed solution of titanium tetrachloride to allow them to react completely to obtain a composite material of an inorganic nonmetallic mineral loaded with a nanotitania layer; and (2) dispersing the resultant composite material in the presence of water and the first dispersant to obtain a suspension, adding a starting material(s) for preparing a functional layer into the composite material suspension to allow them to react completely to obtain a new functional layer loaded on the composite material.

In the above method, step (2) may be repeated to obtain a composite material with multiple functional layers.

In the above method for preparing a composite material, the first dispersant is one or more material selected from the group consisting of sodium polyacrylate, ammonium polyacrylate, polyacrylamide, alkali metal polyphosphate, polycarboxylic acid, sodium polycarboxylate, sodium dodecylsulfate, sodium dodecylsulfonate, sodium lignosulfonate, ammonium salt dispersant, polyester dispersant and polyether dispersant, and the first dispersant for preparing the dispersed suspension of the inorganic nonmetallic mineral and the first dispersant for dispersing the resultant composite material may be the same or different.

In the above method for preparing a composite material, the second dispersant is one or more material selected from the group consisting of polyacrylamide, polyvinyl alcohol, sodium polyacrylate, ammonium polyacrylate, polycarboxylic acid, sodium polycarboxylate, ammonium salt dispersant, polyester dispersant, polyether dispersant, polyethylene glycol dispersant, polyalkenyl alcohol dispersant, polyimides dispersant and polyurethanes dispersant.

In the above method for preparing a composite material, the first dispersant(s) and the second dispersant may be the same or different.

In the above method for preparing a composite material, the inorganic nonmetallic mineral suspension prepared in the presence of water, an inorganic acid and a first dispersant is evenly dispersed with the solid content of 4-50 wt %, wherein the inorganic acid accounts for 2.5-35 wt % of the suspension, and the first dispersant accounts for 0.01-10 wt % of the suspension.

In the above method for preparing a composite material, the weight ratio of water and titanium tetrachloride is (1-10): 1, and the weight of the second dispersant is 0.5-20 wt % of the weight of titanium tetrachloride, for the preparation of the hydrolyzed solution of titanium tetrachloride in the presence of water and the second dispersant.

In the above method for preparing a composite material, the mixing ratio of the inorganic nonmetallic mineral suspension and the hydrolyzed solution of titanium tetrachloride is such that the weight of titanium tetrachloride is 2-60 wt % of the weight of the inorganic nonmetallic mineral.

In the above method for preparing a composite material, the inorganic acid is a strong inorganic acid.

The inorganic acid is one selected from sulfuric acid, hydrochloric acid, and nitric acid, or a mixture of two or more of these acids.

According to the third aspect of the invention, there is provided a composition comprising the composite material of the invention.

The composition may be one useful in coatings, cosmetics, paper making, binders, water treatment, plastics, rubbers, fibers, ceramics, adhesives or cements.

The invention further provides a use of the composite material of the invention in industry as an additive.

The use is one in the fields of paper making, plastics, coatings, fibers, cosmetics, rubbers, ceramics, adhesives, cements or water treatment.

As compared with similar composite materials prepared in prior art, the composite material of the present invention is peculiar in the structure of the loaded nanotitania layer, which is comprised of a plurality of titania nanospheres, and the titania nanosphere is further comprised of a plurality of nanotitania single particles. In contrast, the titania layers of the prior art composite materials, in most cases, are directly comprised of a plurality of nanotitania single particles. As to the composite material of the present invention, due to the feature that the nanotitania layer is comprised of a plurality of titania nanospheres which are further comprised of a plurality of nanotitania single particles, the nanotitania layer may not only have high refractive index and high covering power, but also exhibit its photocatalytic activity. Therefore, the application fields of the composite materials are expanded, and the comprehensive performances of the final products are improved. Furthermore, the titania nanosphere of the invention has higher specific surface energy than the nanotitania single particle of the same size in prior art, so that it can be more readily coated by other functional layer(s) to prepare functionally strengthened or multi-functional composite materials.

The method for preparing composite materials according to the invention may be carried out by a simple process at low cost without high temperature calcination. In the resultant composite materials, the nanotitania layer is firmly loaded onto the inorganic nonmetallic mineral support with a higher loading rate.

The composite materials of the invention have wide applications. For example, they may be used as additives with good compatibility in paper making, plastics, coatings, fibers, cosmetics, rubbers, ceramics, adhesives, cements or water treatment, and so on.

DETAILED DESCRIPTION OF THE INVENTION

The disclosure of the invention will be further described in detail with reference to specific embodiments of the invention.

In the composite material provided by the invention, the nanotitania layer loaded on the inorganic nonmetallic mineral support is comprised of a plurality of titania nanospheres, and the titania nanosphere is further comprised of a plurality of nanotitania single particles. The nanotitania layer of such a structure has high specific surface area, high specific surface energy and more surface dangling bonds, and nanoscale dispersion is realized, so that the advantage of nanotitania is literally effected. Preferably, the diameter of an nanotitania single particle is in the range of 1-20 nm, and the diameter of a titania nanosphere is 2-100 times that of an nanotitania single particle. More preferably, the diameter of an nanotitania single particle is in the range of 2-10 nm, and the diameter of a titania nanosphere is 5-50 times that of an nanotitania single particle. Advantageously, the diameter of a titania nanosphere is in the range of 50-150 nm.

In addition to the properties of UV absorption, photocatalysis and microorganism resistance of the titania layer per se in the composite materials of the invention, these nanotitania single particles have large specific surface area and more surface atoms which are very active and tend to bond with other atoms easily. Owing to this feature, a functional layer may be further loaded on the titania layer readily to prepare a functional composite material. Of course, two or more functional layers may be loaded to prepare a multifunctional composite material.

A variety of functional layers may be loaded on the titania layer, including but not limited to UV shielding protective layer, flame resistant layer, photocatalytic enhancing layer, antimicrobial layer or photocatalytic-antimicrobial enhancing layer.

The UV shielding protective layer comprises one or more oxides selected from the group consisting of silica, hydrated silica, alumina, hydrated alumina, and zirconia. The nanotitania layer serves a function of UV absorption, and the outside UV shielding protective layer is used to prevent free radicals produced in the nanotitania layer after absorption of UV radiation from direct contact with the product for which it is used, so that the free radicals are deactivated and can not oxidative degrade said product (for example, resin in coating, plastic organics, etc.). In other words, the nanotitania layer and the UV shielding protective layer serve together to shield UV radiation.

The flame resistant layer comprises magnesium hydroxide. Further loading of magnesium hydroxide on the nanotitania layer of the composite material of the invention renders effective nano-scale dispersion of the magnesium hydroxide flame resistant material to give a composite material having flame resistant function. Alternatively, a flame resistant layer may be further loaded on a UV shielding protective layer already loaded on the nanotitania layer, or a UV shielding protective layer may be further loaded on a flame resistant layer already loaded on the nanotitania layer, so as to form multifunctional composite materials featuring both UV shielding and flame resistance. Such composite materials may be widely used in the fields of plastics and coatings.

The photocatalytic enhancing layer comprises zinc oxide. When a photocatalytic material (for example, zinc oxide) is further loaded on the nanotitania layer of the composite material of the invention, zinc oxide and the nanotitania layer may function synergeticly to further activate the photocatalytic property, so that a photocatalytic material with more excellent performance may be obtained.

The antimicrobial layer comprises silver salt. The silver salt is preferably silver chloride or silver phosphate. Loading of the antimicrobial layer may improve the antimicrobial and antifungus effect of the composite material in dark light.

Similarly, both a photocatalytic enhancing layer and an antimicrobial layer may be loaded onto the composite material of the invention to prepare a bi-functional composite material having both photocatalytic function and dark-light antimicrobial, antifungus function. Alternatively, a photocatalytic material and an antimicrobial material may be mixed together to prepare a photocatalytic-antimicrobial layer, so that the loading of just one layer of the mixture of a photocatalytic material and an antimicrobial material may realize both photocatalytic antimicrobial, antifungus function and dark-light antimicrobial, antifungus function.

In addition, the titania nanosphere composed of single nanoparticles in the nanotitania layer of the composite material of the invention has high refractive index and increased opacity. Thus, the composite material formed from the nanotitania layer and the inorganic nonmetallic mineral support has high covering power by itself, and may be very favorably used in the fields of plastics, coatings and the like to partially replace titanium white.

The above-mentioned functional layers and combinations thereof are just for example. Those skilled in the art may choose and prepare suitable functional layers and combinations thereof based on particular applications and needs.

The "nanotitania layer" as described herein may coat the surface of the inorganic nonmetallic mineral support completely or partially. In the case that the nanotitania layer coats the support surface completely, titania nanospheres are loaded substantially on the whole support surface. In the case that the nanotitania layer coats the support surface partially, titania nanospheres are scattered on the support surface. That is to say, a portion of the support surface has titania nanospheres loaded, while the rest of the support surface remains bare. The coating coverage level of the nanotitania layer depends on the loading amount of the nanotitania layer relative to the inorganic nonmetallic mineral support layer. The loading amount is generally determined by particular requirements, including those relevant to application and cost.

In a preferred embodiment of the invention, a composite material according to the invention is prepared as follows:

An inorganic nonmetallic mineral used as a support material is dispersed in the presence of water, an inorganic acid and a first dispersant, and agitated (more preferably agitated at 50-100° C.) to form an evenly dispersed suspension, wherein the solid content of the suspension is 4-50 wt % (more preferably 10-35 wt %), the inorganic acid accounts for 2.5-35 wt % (more preferably 2.5-15 wt %) of the suspension, and the first dispersant accounts for 0.01-10 wt % (more preferably 0.1-3 wt %) of the suspension;

a hydrolyzed solution of titanium tetrachloride is prepared in the presence of water and a second dispersant, wherein the weight ratio of water and titanium tetrachloride is (1-10):1, more preferably (1-8):1, and the second dispersant is 0.5-20 wt %, more preferably 0.5-10 wt % of titanium tetrachloride; and the inorganic nonmetallic mineral suspension and the hydrolyzed solution of titanium tetrachloride are mixed (more preferably by addition of the hydrolyzed solution of titanium tetrachloride into the inorganic nonmetallic mineral suspension) and allowed to react completely to give a composite material of a nanotitania layer loaded on an inorganic nonmetallic mineral support, which is filtered and rinsed (more preferably rinsed until pH of the filtrate was in the range of 4-7) to give a composite material product, wherein the mixing ratio of the inorganic nonmetallic mineral suspension and the hydrolyzed solution of titanium tetrachloride is such that titanium tetrachloride is 2-60 wt %, more preferably 4-40 wt % of the inorganic nonmetallic mineral.

In another preferred embodiment of the invention, a composite material with a functional layer according to the invention is prepared as follows: the composite material product of the nanotitania layer loaded on the inorganic nonmetallic mineral support as obtained above is dispersed in the presence of water and the first dispersant (more preferably under agitation at 50-100° C.) to give a suspension with a solid content of 10-30 wt %, and the starting material for preparing the functional layer is added into the suspension after pH of the suspension is adjusted to 4-11, followed by complete reaction, filtration and drying to give a composite material with a functional layer loaded further on the nanotitania layer.

In the above embodiment, the starting materials for preparing functional layer(s) may be selected according to the desired function. For example, the starting material for preparing a UV shielding protective layer may be a silicon source, an aluminum source and/or a zirconium source. The silicon source may be one of sodium silicate, water glass, silica sol and the like, or a mixture of two or more of these sources. The aluminum source may be one of aluminum chloride, aluminum sulfate, sodium metaaluminate and the like, or a mixture of two or more of these sources. The zirconium source may be one of zirconium oxychloride, zirconium sulfate or zirconium oxysulfate and the like, or a mixture of two or more of these sources. As another example, the starting material for preparing a flame resistant layer may be a magnesium source. The magnesium source may be a soluble magnesium salt such as magnesium sulfate, magnesium chloride, etc. While the above starting material(s) is/are added into the suspension as desired, a corresponding acid, base or salt is added at the same time to obtain a corresponding functional layer by reaction. The corresponding acid is one of sulfuric acid, hydrochloric acid, nitric acid and the like, or a mixture of two or more of these acids. The corresponding base may be one of sodium hydroxide, potassium hydroxide, aqueous ammonia and the like, or a mixture of two or more of these bases. The corresponding salt may be a chloride salt such as potassium chloride, sodium chloride or ammonium chloride.

In a preferred embodiment of the invention, the first dispersant can be one or more materials selected from the group consisting of sodium polyacrylate, ammonium polyacrylate, polyacrylamide, alkali metal polyphosphate (such as sodium triphosphate, sodium hexametaphosphate or sodium pyrophosphate), polycarboxylic acid, sodium polycarboxylate, sodium dodecylsulfate, sodium dodecylsulfonate, sodium lignosulfonate, ammonium salt dispersant, polyester dispersant and polyether dispersant. The second dispersant can be one or more materials selected from the group consisting of polyacrylamide, polyvinyl alcohol, sodium polyacrylate, ammonium polyacrylate, polycarboxylic acid, sodium polycarboxylate, ammonium salt dispersant, polyester dispersant (such as polyethylene glycol ester of fatty acid), polyether dispersant, polyethylene glycol dispersant, polyalkenyl alcohol dispersant, polyimides dispersant and polyurethanes dispersant. The first dispersant for preparing the dispersed suspension of the inorganic nonmetallic mineral and the first dispersant for dispersing the resultant composite material to load the functional layers may be the same or different. The first dispersant(s) and the second dispersant may be the same or different.

The composite materials of the invention may be used in the fields of paper making, plastics, coatings, fibers, cosmetics, rubbers, ceramics, adhesives, cements or water treatment, etc. in a way substantially similar to that of conventional pigment such as titanium white or inorganic fillers such as talcum powder, sericite, kaolin, titanium white, barium sulfate, etc. The composite materials of the invention may be added in an amount of 1-20 wt %. The composite materials of the invention may not only be used as common inorganic fillers in the foregoing fields, but also partly replace titanium white powder in the products of the foregoing fields to some extent. In addition, it can further impart the products with such functions as UV shielding, flame resistance, photocatalysis and/or microorganism resistance, and so on.

The invention will be further demonstrated with reference to specific examples. It is to be understood that these examples are merely used to illustrate the invention without limiting the scope of the invention. If no specific conditions are indicated, the experimental procedures in the following examples are to be carried out under conventional conditions or as suggested by the manufacturers. Unless otherwise specified, all parts are parts by weight, and all percentages are percentages by weight.

EXAMPLE 1

400 g sericite having particle size of 1250 mesh was added into a mixture solution formulated from 1100 g water, 70 g sulfuric acid, 1.6 g sodium hexametaphosphate and 0.4 g polyacrylamide, and agitated at 80-90° C. to form an evenly dispersed suspension. 50 g titanium tetrachloride was weighed, into which was added dropwise 110 g of an aqueous solution containing 3 g polyethylene glycol 1200, 1 g polyvinyl alcohol (PVA) and 0.5 g polyimide dispersant to form a stable hydrolyzed solution of titanium tetrachloride. The hydrolyzed solution of titanium tetrachloride was added dropwise into the suspension containing sericite. After 4 hours of reaction, the resultant product was filtered and rinsed until pH of the filtrate was about 4. The resultant composite material cake was dried to give functional composite material 1.

The resultant composite material product was observed and tested as follows.

Measurement of Loading Amount

The loading amount of titania in the composite material obtained in Example 1 was measured using metallic aluminum reduction method according to GB/T 1706-2006, and the result was 5%.

Examination of Composite Material by Transmission Electron Microscope

The obtained composite material product was dispersed in ethanol solvent at a concentration of 0.05%-0.1%, and was ultrasonicated for 20 minutes to give a homogeneous suspension. The suspension was added dropwise on a copper screen, then observed using a high magnification transmission electron microscope. FIGS. 1-4 are TEM images with magnifications of ×10000, ×30000, ×100000, ×500000 respectively. It can be seen from these images that in the composite material product prepared in Example 1, a nanotitania layer was loaded on a sericite support 1, wherein the nanotitania layer was comprised of a plurality of titania nanospheres 2, and the titania nanosphere was further comprised of a plurality of nanotitania single particles 3. The diameter of the nanotitania single particles was 4-8 nm, and the diameter of the titania nanospheres was 50-85 nm. In addition, no free titania nanoparticle was found under the high magnification transmission electron microscope.

Figure 1:
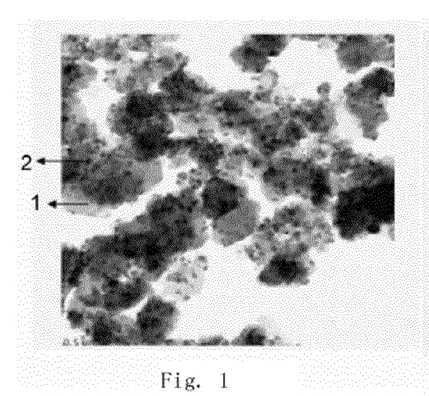
FIG. 1 is a TEM image (×10000) of the composite material of sericite loaded with a nanotitania layer prepared according to Example 1.
Figure 2:
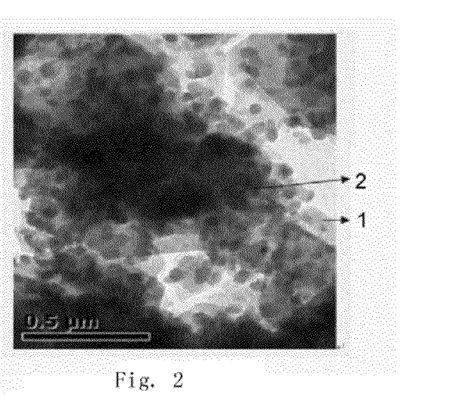
FIG. 2 is a TEM image (×30000) of the composite material of sericite loaded with a nanotitania layer prepared according to Example 1.
Figure 3:
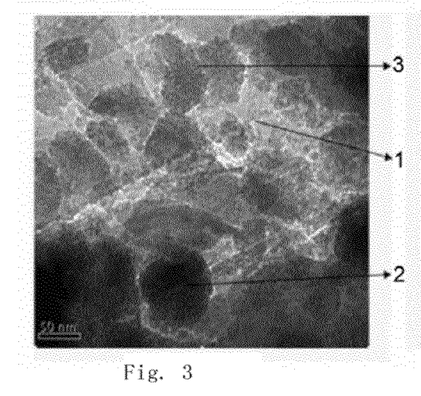
FIG. 3 is a TEM image (×100000) of the composite material of sericite loaded with a nanotitania layer prepared according to Example 1.
Figure 4:
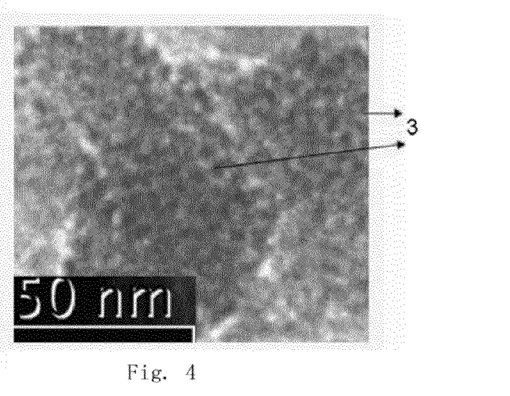
FIG. 4 is a TEM image (×500000) of the composite material of sericite loaded with a nanotitania layer prepared according to Example 1.
Figure 5:
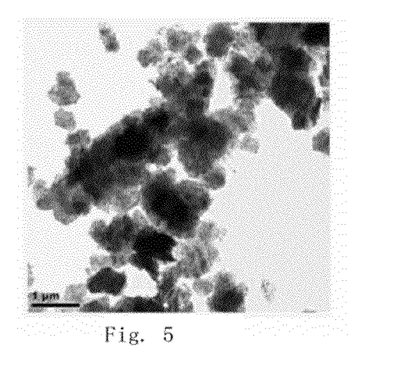
FIGS. 5 and 6 are TEM images (×5000) showing different areas of the composite material of sericite loaded with a nanotitania layer prepared according to Example 1 after dispersed at a high speed of 10000 rpm using a high speed homogenizer in the test of the load firmness of the titania layer.
Figure 6:
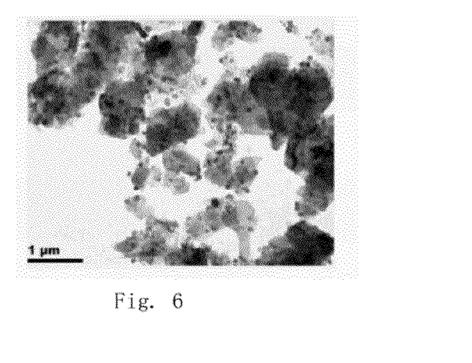
Figure 7:
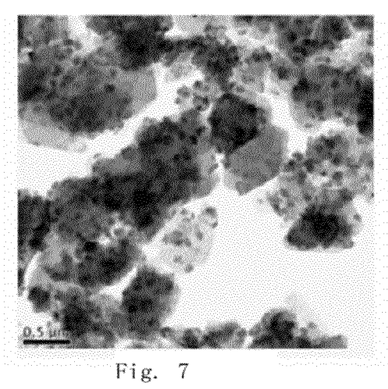
FIG. 7 is a TEM image (×20000) of the composite material of sericite loaded with a nanotitania layer prepared according to Example 1 after dispersed at a high speed of 10000 rpm using a high speed homogenizer in the test of the load firmness of the titania layer.
Figure 8:
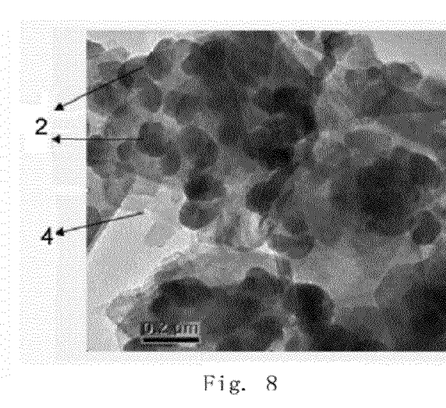
FIG. 8 is a TEM image (×20000) of the composite material of kaolin loaded with a nanotitania layer prepared according to Example 2.
Figure 9:
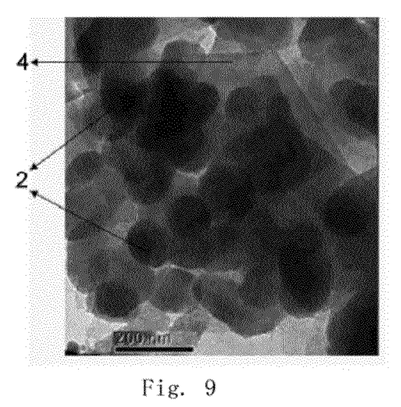
FIG. 9 is a TEM image (×30000) of the composite material of kaolin loaded with a nanotitania layer prepared according to Example 2.
Figure 10:
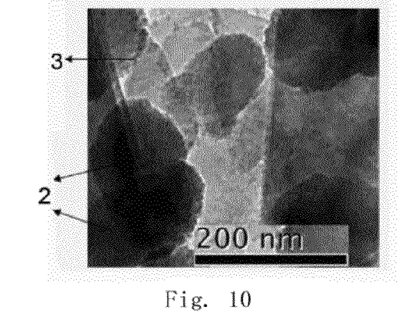
FIG. 10 is a TEM image (×50000) of the composite material of kaolin loaded with a nanotitania layer prepared according to Example 2.
Figure 11:
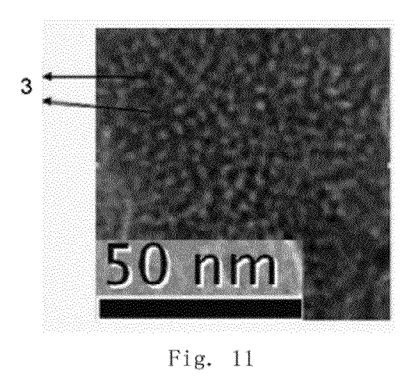
FIG. 11 is a TEM image (×500000) of the composite material of kaolin loaded with a nanotitania layer prepared according to Example 2.

Testing Loading Firmness of Titania Layer 1 g of the composite material obtained in Example 1 was made into a 5% suspension in 20 g ethanol. The suspension was dispersed for 4 hours at 10000 rpm using a high speed dispersing homogenizer, and then diluted to a concentration of 0.05% using ethanol. 0.02 ml of the diluted suspension was sampled to be examined using a transmission electron microscope. An area in which distinct particles were concentrated while distributed evenly was selected to take TEM images at 5000× and 20000× magnifications respectively, as shown in FIGS. 5-7, wherein FIGS. 5 and 6 show the TEM images with 5000× magnification taken at different areas. It can be directly seen from these images that substantially no free titania nanospheres appeared after the composite material obtained in Example 1 was dispersed using a high speed dispersing homogenizer. This indicates that the nanotitania layer was firmly loaded on the lamellar surface of sericite.

EXAMPLE 2

500 g kaolin having particle size of 800 mesh was added into a mixture solution formulated from 2000 g water, 300 g hydrochloric acid, 50 g sulfuric acid, 2 g sodium hexametaphosphate and 1 g polyether L61 (available from Guangzhou Chengfeida Trade Co. Ltd.), and agitated at 80-90° C. to form an evenly dispersed suspension. 240 g titanium tetrachloride was weighed, into which was added 1900 g of an aqueous solution containing 6 g polycarboxylate TH-361 (available from Shandong Taihe Water Treatment Co. Ltd.), 3 g polyethylene glycol 1200 and 1 g polyvinyl alcohol (PVA) to form a stable hydrolyzed solution of titanium tetrachloride. The hydrolyzed solution of titanium tetrachloride was added dropwise into the suspension containing kaolin. After 6 hours of reaction, the resultant product was filtered and rinsed until pH of the filtrate was about 5. The resultant composite material cake was dried to give functional composite material 2.

The resultant composite material product was observed and tested as follows.
Measurement of Loading Amount The loading amount of titania in the composite material obtained in Example 2 was measured using metallic aluminum reduction method according to GB/T 1706-2006, and the result was 19.5%.
Examination of Composite Material by Transmission Electron Microscope The obtained composite material product was dispersed in ethanol solvent at a concentration of 0.05%-0.1%, and was ultrasonicated for 20 minutes to give a homogeneous suspension. The suspension was added dropwise on a copper screen, then observed using a high magnification transmission electron microscope. FIGS. 8-11 are TEM images with magnifications of ×20000, ×30000, ×50000, ×500000 respectively. It can be seen from these images that in the composite material product prepared in Example 2, a nanotitania layer was loaded on a kaolin support 4, wherein the nanotitania layer was comprised of a plurality of titania nanospheres 2, and the titania nanosphere was further comprised of a plurality of nanotitania single particles 3. The diameter of the nanotitania single particles was 2-10 nm, and the diameter of the titania nanospheres was 120-200 nm. In addition, no free titania nanoparticle was found under the high magnification transmission electron microscope.

EXAMPLE 3

600 g sericite having particle size of 800 mesh was added into a mixture solution formulated from 1100 g water, 40 g hydrochloric acid, 10 g sulfuric acid, 6 g sodium hexametaphosphate and 2 g polycarboxylate GY-D06 (available from Central Research Institute of China Chemical Science & Technology), and agitated at 85-95° C. to form an evenly dispersed suspension. 200 g titanium tetrachloride was weighed, into which was added dropwise 600 g of an aqueous solution containing 1 g polyethylene glycol 1200, 0.4 g polyvinyl alcohol (PVA) and 0.6 g polyethylene glycol laurate-PEG200 mL (available from Hai'an Petrochemical Plant, Jiangsu) to form a stable hydrolyzed solution of titanium tetrachloride. The hydrolyzed solution of titanium tetrachloride was added dropwise into the suspension containing sericite. After 4 hours of reaction, the resultant product was filtered and rinsed until pH of the filtrate was about 7. The resultant composite material cake was dried to give functional composite material 3.

Figure 12:
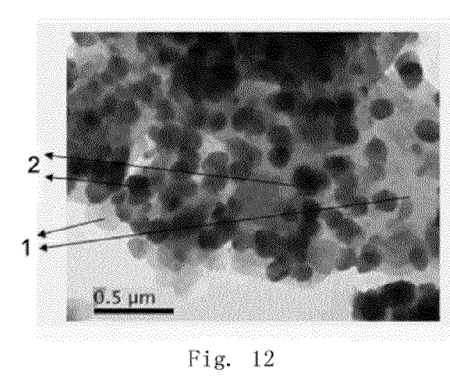
FIG. 12 is a TEM image (×20000) of the composite material of sericite loaded with a nanotitania layer prepared according to Example 3.
Figure 13:
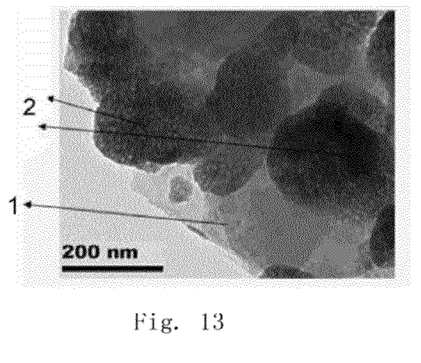
FIG. 13 is a TEM image (×50000) of the composite material of sericite loaded with a nanotitania layer prepared according to Example 3.
Figure 14:
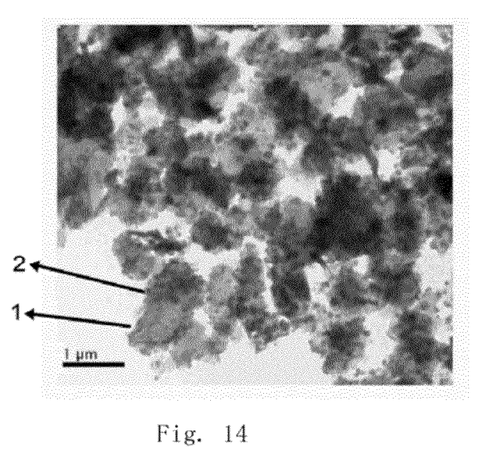
FIG. 14 is a TEM image (×10000) of the composite material of sericite loaded with a nanotitania layer prepared according to Example 3.

The resultant composite material product was observed and tested as follows.
Measurement of Loading Amount The loading amount of titania in the composite material obtained in Example 3 was measured using metallic aluminum reduction method according to GB/T 1706-2006, and the result was 12%.
Examination of Composite Material by Transmission Electron Microscope The obtained composite material product was dispersed in ethanol solvent at a concentration of 0.05%-0.1%, and was ultrasonicated for 20 minutes to give a homogeneous suspension. The suspension was added dropwise on a copper screen, then observed using a high magnification transmission electron microscope. FIGS. 12-14 are TEM images with magnifications of ×20000, ×50000, ×10000 respectively. It can be seen from these images that in the composite material product prepared in Example 3, a nanotitania layer was loaded on a sericite support 1, wherein the nanotitania layer was comprised of a plurality of titania nanospheres 2, and the titania nanosphere was further comprised of a plurality of nanotitania single particles 3. The diameter of the nanotitania single particles was 2-10 nm, and the diameter of the titania nanospheres was 150-250 nm. In addition, no free titania nanoparticles were found using the high magnification transmission electron microscope.

EXAMPLE 4

Loaded with UV Shielding Protective Layer 400 g of the composite material obtained in Example 1 was added into 1200 g water to make slurry, meanwhile 0.2 g sodium polyacrylate and 0.4 g sodium pyrophosphate were added, followed by agitation to prepare an evenly dispersed suspension. The suspension was heated to 80° C., and pH was adjusted to 10 by addition of 10% sodium hydroxide. To the suspension was added 150 g 10% aqueous solution of sodium silicate, and 10% aqueous solution of sulfuric acid was added concurrently with pH maintaining 10. After the above addition was completed, the temperature was decreased to 70° C., and pH was adjusted to 8 by addition of 10% sulfuric acid. Subsequently, 120 g of 4% zirconium oxychloride was added into the suspension, and 10% aqueous solution of sulfuric acid was added concurrently to keep pH constant. After the above addition was completed, the resultant slurry was filtered and washed. The filter cake was dried at 150° C. for 8 hours, and then pulverized to 1250 meshes to give a functional composite material 4.

Figure 15:
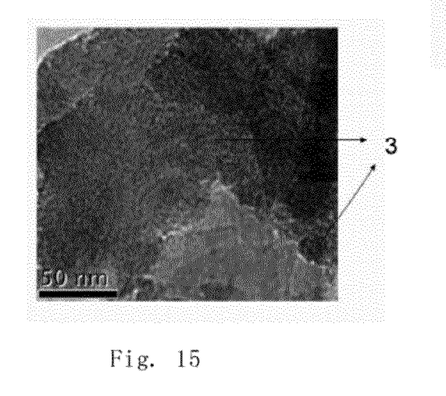
FIG. 15 is a TEM image (×200000) of the composite material of sericite loaded with a nanotitania layer prepared according to Example 3.
Figure 16:
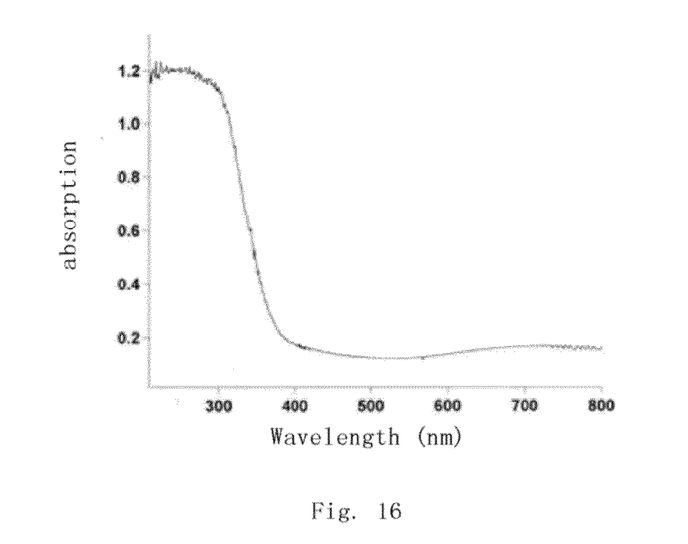
FIG. 16 is a UV-Vis diffuse reflectance absorption spectrum of the functional composite material prepared according to Example 4.

The UV-Vis diffuse reflectance absorption behavior of the functional composite material obtained in this example was tested using a UV-Vis-NIR Spectrophotometer according to General Rules for Ultraviolet and Visible Absorption Spectroscopy JY/T022-1996, and the resultant spectrum was shown in FIG. 15. It can be seen from FIG. 15 that ultraviolet radiation in the range of 200-380 nm can be well absorbed by this functional composite material. Therefore, this composite material functions well in shielding ultraviolet radiation.

EXAMPLE 5

Loaded with UV Shielding Protective Layer and Flame Resistant Layer 400 g of the composite material obtained in Example 2 was added into 1200 g water to make slurry, meanwhile 0.6 g sodium polyacrylate and 0.4 g sodium hexametaphosphate were added, followed by agitation to prepare an evenly dispersed suspension. The suspension was heated to 80° C., and pH was adjusted to 10 by addition of 10% sodium hydroxide. To the suspension was added 120 g of 10% aqueous solution of sodium silicate, and 10% aqueous solution of sulfuric acid was added concurrently with pH maintaining 10. After the above addition was completed, the temperature was decreased to 70° C., and pH was adjusted to 5 by addition of 10% sulfuric acid. Subsequently, 90 g of 10% sodium metaaluminate was added into the suspension, and 10% aqueous solution of sulfuric acid was added concurrently to keep pH constant. After the above addition was completed, pH was adjusted to 8 using 10% sodium hydroxide, and this pH as well as the temperature were kept constant. Subsequently, 240 g of 15% magnesium chloride solution was added into the suspension, and 10% sodium hydroxide was added concurrently to keep pH constant.

After the above addition was completed, the resultant slurry was filtered and washed. The filter cake was dried at 150° C. for 8 hours, and then pulverized to 1250 meshes to give a functional composite material 5.

EXAMPLE 6

Loaded with Photocatalytic Enhancing Layer 400 g of the composite material obtained in Example 2 was added into 1200 g water to make slurry, meanwhile 0.6 g sodium polyacrylate and 0.4 g sodium hexametaphosphate were added, followed by agitation to prepare an evenly dispersed suspension. The suspension was heated to 80° C., and pH was adjusted to 8 by addition of 10% sodium hydroxide. To the suspension was added 40 g of 5% aqueous solution of zinc chloride, and 7% sodium hydroxide solution was added concurrently with pH maintaining 8. After the above addition was completed, the resultant slurry was filtered and washed. The filter cake was dried at 150° C. for 8 hours, and then pulverized to 1250 meshes to give a functional composite material 6.

EXAMPLE 7

Loaded with Antimicrobial Layer 400 g of the composite material obtained in Example 3 was added into 1200 g water to make slurry, meanwhile 0.2 g sodium polyacrylate and 0.4 g sodium pyrophosphate were added, followed by agitation to prepare an evenly dispersed suspension. The suspension was heated to 80° C., and pH was adjusted to 8 by addition of 10% sodium hydroxide. To the suspension was added 50 g of 1% aqueous solution of silver nitrate, and 3% aqueous solution of sodium chloride was added concurrently with pH maintaining 8. After the above addition was completed, the temperature was decreased to 70° C., and the resultant slurry was filtered and washed. The filter cake was dried at 150° C. for 8 hours, and then pulverized to 1250 meshes to give a functional composite material 7.

EXAMPLE 8

Loaded with Photocatalytic-Antimicrobial Layer 400 g of the composite material obtained in Example 3 was added into 1200 g water to make slurry, meanwhile 0.6 g sodium polyacrylate and 0.4 g sodium hexametaphosphate were added, followed by agitation to prepare an evenly dispersed suspension. The suspension was heated to 80° C., and pH was adjusted to 8 by addition of 10% sodium hydroxide. To the suspension was added 40 g of 5% aqueous solution of zinc chloride, and 7% sodium hydroxide solution and 50 g of 1% silver nitrate solution were added concurrently with pH maintaining 8. After the above addition was completed, the resultant slurry was filtered and washed. The filter cake was dried at 150° C. for 8 hours, and then pulverized to 1250 meshes to give a functional composite material 8.

EXAMPLE 9

Use of the Functional Composite Material 4 in Cosmetics with Foundation Cream as an Example The functional composite material 4 prepared in Example 4 was used as a cosmetic additive to prepare a sun protection emulsion according to the following formulation.

| Foundation Emulsion Formulation | wt % |
| --- | --- |
| Stearic acid | 2.0 |
| Hexadecanol | 0.3 |
| White oil | 12 |
| Polyoxyethylene (10) oleate | 1.0 |
| Span-80 | 1.0 |
| Triethanolamine | 1.0 |
| Polyethylene glycol | 5.0 |
| Functional composite material 4 | 9 |
| Talc powder | 6.0 |
| Propylene glycol | 5.0 |
| Preservative | 0.15 |
| Essence | 0.05 |
| Magnesium aluminosilicate | 0.5 |
| Deionized water | 57 |

The stearic acid, the hexadecanol, the white oil and the polyoxyethylene oleate were heated to 70-75° C. under continuous agitation, so as to make them melt or dissolve adequately and evenly to prepare a homogeneous oil phase for later use.

The functional composite material 4, the talc powder and the magnesium aluminosilicate were added into 20 g water and dispersed under agitation for 30 minutes to make them dispersed evenly. Then, Span-80, the triethanolamine, the propylene glycol, the polyethylene glycol and 37 g water were added, and the mixture was agitated and heated to 90-100° C., then held for 20 minutes for sterilization. Thereafter, it was cooled to 70-75° C. to give the desired aqueous phase system. While the temperature was kept at 70-75° C., the prepared oil phase was slowly added into the aqueous phase under agitation to prepare an oil/water sun protection emulsion. After the preservative and the essence were added slowly, the desired product was obtained.

The obtained sun protection emulsion containing the functional composite material 4 was tested according to ISO/TR 26369:2009 "Cosmetics—Sun protection test methods—Review and evaluation of methods to assess the photoprotection of sun protection products". The sun protection factor of this sun protection emulsion was determined to be SPF15. This result has verified that incorporation of this functional composite material into cosmetics may impart physical sun protection efficacy to the products.

EXAMPLE 10

Use of the Functional Composite Material 4 in Coatings with Latex Paint for Exterior Wall as an Example The functional composite material 4 prepared in Example 4 was used as a coating additive to prepare a latex paint according to the following formulation.

| | |
|---|---|
| Water | 129 g |
| Hydroxyethyl cellulose thickener (2%) | 140 g |
| Preservative Parmentol | 1.5 g |
| Wetting dispersant Calgon N | 2.5 g |
| Humectant enapon PN30 | 3 g |
| Defoaming agent Agitan 280 | 4 g |
| Heavy calcium carbonate | 120 g |
| Talc powder | 125 g |
| Sericite powder | 24 g |
| Titanium white powder | 80 g |
| Functional composite material 4 | 40 g |
| Aqueous ammonia (25%) | 1 g |
| Film forming auxiliary Texamol | 20 g |
| Propylene glycol | 20 g |
| Emulsion Acronal 290 D | 270 g |

The talcum powder, the titanium white powder, the functional composite material 4, the heavy calcium carbonate, the sericite, the preservative, the defoaming agent, the wetting dispersant, the humectant enapon and 70 g water were first dispersed at high speed for 1 hour using a high speed dispersion machine, and then the emulsion Acronal 290 D, the film forming auxiliary, the propylene glycol, the thickener, 59 g water and the like were added and agitated for 1 hour. Subsequently, pH was adjusted to 7-8 with 25% aqueous ammonia to prepare a latex paint.

Comparative Example 1

Latex Paint with Titanium White Powder as the Additive without Using the Functional Composite Material 4

A latex paint was prepared as in Example 10, except that 120 g titanium white powder was used instead of 80 g titanium white powder and 40 g functional composite material 4.

The properties of the latex paints prepared in Example 10 and Comparative Example 1 were tested according to GB/T9755-2001 "Synthetic resin emulsion coatings for exterior wall", and the results were shown below:

| Properties Tested | Example 10 | Comparative Example 1 |
|---|---|---|
| Contrast ratio (whiteness and light color) | 0.933 | 0.938 |
| Drying time (surface drying)/h ≤ | 2 h | 2 h |
| Water resistance (96 h) | Not abnormal | Not abnormal |
| Whiteness | 93.4 | 94.2 |
| Artificial aging resistance | 600 h | 600 h |
| Chalking/Grade ≤ | 1 | 1 |
| Discoloring/Grade ≤ | 2 | 2 |
| Scrubbing resistance | >5000 times | >5000 times |
| Low temperature stability | Not degraded | Not degraded |

This indicates that the functional composite material of the present invention may substitute a part of titanium white powder in latex paint, so as to decrease the production cost of latex paint without changing properties thereof.

Example 11

Use of the Functional Composite Material 8 in Coatings with Powder Coating as an Example

| | |
|---|---|
| Epoxy resin Araldite 7004 (Ciba-Geigy Co.) | 64.38 g |
| Leveling agent modaflow(Ciba-Geigy Co.) | 0.32 g |
| Titania | 24.2 g |
| Functional composite material 8 | 8 g |
| Curing agent HT-2833((Ciba-Geigy Co.) | 3.1 g |

The leveling agent was predispersed in the epoxy resin at a ratio of 10%, and then the mixed components were pulverized to 3-5 mm in particle diameter. The remaining epoxy resin was also pulverized to 3-5 mm in particle diameter. All of the components were premixed for 10 minutes according to the above formulation. Then the resultant homogeneous mixture was charged into an extruder for extrusion, wherein the temperature inside the extruder chamber was 75-85° C., and the temperature of the extruder head was 95° C. The extrudant was cooled and then pulverized.

Comparative Example 2

Powder Coating with Titanium White Powder as the Additive without Using the Functional Composite Material 8

A powder coating was prepared as in Example 11, except that 32.2 g titanium white powder was used instead of 24.2 g titanium white powder and 8 g functional composite material 8.

The epoxy powder coatings prepared in Example 11 and Comparative Example 2 were electrostatic sprayed respectively, and the properties of the resultant coating layers were tested according to GB/T21776-2008 "Standard guide for testing powdery coatings and coating layers thereof". The results were shown below:

| Properties Tested | Example 11 | Comparative Example 2 |
|---|---|---|
| Covering power (contrast ratio) | 0.941 | 0.943 |
| Whiteness | 92 | 93 |
| Impact Resistance | Passed direct and reverse impact tests | Passed direct and reverse impact tests |
| Appearance | Flat, smooth | Flat, smooth |
| Coating thickness | 65-70 μm | 65-70 μm |
| Gloss | ≥85 | ≥85 |
| Sterilizing rate | | |
| *Staphylococcus aureus* | >99% | >24% |
| *Escherichia coli* | >99% | >31% |
| *Monilia albican* | >93% | 0 |
| Degradation rate of formaldehyde for 24 hours | 83% | 33.4% |

This indicates that incorporation of the functional composite material 8 having antimicrobial, formaldehyde-degrading and like efficacies into powder coatings can not only substitute a part of titanium white powder, but also impart the powder coatings with antimicrobial and air-purifying effects without compromising the powder coating properties.

EXAMPLE 12

Use of the Composite Material 5 in Plastics with ABS Plastics (Acrylonitrile-Butadiene-Styrene Plastics) as an Example Formulation Composition (Parts by Mass):

| | |
|---|---|
| ABS resin | 300 g |
| Composite material 5 | 240 g |
| Silane coupling agent KH550 | 0.24 g |

The ABS resin, the silane coupling agent and the composite material 5 were charged into a high speed agitator to be agitated for 5 minutes, and then extrusion pelletized through a double-screw reactive extruder set, wherein each section of the extruder had a temperature in the range of 200-240° C. The extruded pellets were compounded in a double-roll plasticator at 150° C., and then press formed, wherein the forming temperature was 170° C., the preheating time was 2 minutes, the pressure hold time was 5 minutes, and the pressure was 55 MPa.

Comparative Example 3

ABS Plastics Article without the Composite Material 5

According to the same method as in Example 12, an ABS plastics article was prepared directly only without addition of the composite material 5.

After the ABS plastics pellets prepared in Example 12 and Comparative Example 3 were press formed, the ABS plastics was pressed into sheets and then tested according to GB/T2406-1993 "Plastics—Determination of flammability by oxygen index", "Plastics—Determination of flammability by smoke density", with GB/T 4609-1984 for vertical burning behavior and GB/T 2408-1996 for horizontal burning behavior.

The following properties were tested and the resultant were shown below.

| Properties Tested | Example 12 | Comparative Example 3 |
|---|---|---|
| Oxygen index | 22% | 17.5% |
| Smoke density level | 68 | 81.08 |
| Horizontal burning level | II | III |
| Vertical burning level | FV-0 | Lower than FV-2 |
| Smoke amount in air | Less black smoke | More black smoke |

This indicates that incorporation of the functional composite material 5 having flame resultant efficacy into ABS plastics can raise the oxygen index of the plastics and reduce black smoke significantly.

EXAMPLE 13

Use of the Composite Material 6 in Chemical Fiber with Polypropylene Non-Woven Cloth as an Example Formulation Composition:

| | |
|---|---|
| Functional composite material 6 | 3 g |
| Titanate coupling agent | 0.1 g |
| Liquid wax | 0.3 g |
| Zinc stearate | 0.2 g |
| Polyacrylic acid wax | 20 g |
| Polypropylene resin | 76.4 g |

26.4 g of the polypropylene resin, 3 g of the functional composite material 6 and 0.1 g of the titanate coupling agent were activated through high speed agitation for 15 minutes, and then 0.3 g of the liquid wax, 0.2 g of the zinc stearate and 20 g of the Polyacrylic acid wax were added. The whole mixture was mixed evenly through adequate agitation, and formed into modified polypropylene master batch containing the functional composite material 6 using a master batch pelletizer. The obtained master batch was mixed evenly with 50 g of the polypropylene resin, and the resultant mixture was melted in a screw extruder. A polypropylene non-woven cloth containing 3% of the functional composite material 6 was made after spinning, drawing, netting and hot rolling. The non-woven cloth had antimicrobial and antifungus efficacies.

Comparative Example 4

Polypropylene Non-Woven Cloth Article without the Functional Composite Material 6

According to the same method as in Example 13, a polypropylene non-woven cloth was prepared directly without addition of the composite material 6 and a titanate coupling agent. Antimicrobial behavior was tested for Example 13 and Comparative Example 4 according to GB/T 23763-2009/Photo-catalytic antimicrobial materials and articles thereof—Assessment for antimicrobial activity and efficacy.

| | Sterilizing Rate | |
|---|---|---|
| | Example 13 | Comparative Example 4 |
| Staphylococcus aureus | >99% | 0 |
| Escherichia coli | >99% | 0 |
| Monilia albican | >93% | 0 |

EXAMPLE 14

Use of Composite Material 4 in Paper Making with Coated Paper as an Example

Experimental Materials

Raw paper (white board): basis weight 22518 g.m$^2$, density 0.75 g.m$^3$, whiteness 75.72%, opacity 98.63%, PPS roughness 7.44 μm; gloss 11.7%.

Primer Formulation:

Heavy $CaCO_3$ 80 g, kaolin 20 g, sodium polyacrylate 0.4 g, styrene butadiene rubber latex (SBR) 10 g, hydroxymethyl cellulose (CMC) 0.4 g, calcium stearate 0.4 g, butanol 0.2 g, octanol 0.1 g, starch 6 g, solid content of the primer 60%.

Primer Preparation:

80 g of the heavy $CaCO_3$, 20 g of the kaolin, 0.4 g of the sodium polyacrylate and 30 g water were dispersed for 30 minutes using a high speed dispersion machine.

The starch was dispersed through agitation in 6 g water at 70° C.

The two predispersed starting materials as prepared above were mixed with the remaining starting materials while water was added under agitation to prepare a primer with solid content of 60% for later use.

Top Coating Formulation:

Kaolin 60 g, $CaCO_3$ 20 g, the functional composite material 4 20 g, sodium hexametaphosphate 0.4 g as the dispersant, styrene butadiene rubber latex (SBR) 13 g, hydroxymethyl cellulose (CMC) 0.5 g, calcium stearate 0.5 g, butanol defoaming agent 0.2 g and octanol 0.1 g were used to prepare a top coating with solid content of 50% for later use.

Coating, Drying and Calendaring

Coating was operated on a K303 coater, wherein the coating amount of the primer was 8-10 $g/m^2$, and that of the top coating was 10-12 $g/m^2$. Hot air drying was applied, and the drying temperature was controlled at 105° C. The coated paper had to be moisture conditioned before calendaring.

Comparative Example 5

No Incorporation of the Functional Composite Material 4 in the Above Coated Paper Formulation, but with Kaolin Instead of the Composite Material Primer and top coating were prepared as in Example 14, except that 20 g kaolin was used instead of 20 g of the composite material 4.

Test of Coated Paper Properties

The physical properties of the coated paper prepared in Example 14 and Comparative Example 5 were tested according to National Standard GB-T 10335.4-2004 "Coated paper and board—Coated white board".

| Measurement Items | Whiteness (%) | Opacity (%) | Smoothness (/s) | Paper gloss (%) | Printing gloss (%) | Surface strength (/ms$^{-1}$) | Ink absorbency % |
|---|---|---|---|---|---|---|---|
| Example 14 | 87.1 | 93.6 | 485 | 52.2 | 79.0 | 2.34 | 21.48 |
| Comparative Example 5 | 86.3 | 92 | 471 | 50.8 | 78.2 | 2.16 | 17.66 |

This indicates that incorporation of the functional composite material 4 in coated paper can effectively take advantage of the properties of the nanoparticles loaded on microparticles, such as high specific surface area and high surface energy, so that the properties of paper coatings may be improved effectively.

EXAMPLE 15

Use of the Functional Composite Material 6 in Paper (with the Functional Composite Material 6 Added in Pulp)

Process:

Pulp beating was carried out at softwood pulp (45° SR): hardwood pulp (25° SR)=40:60. The papermaking pulp was designed to be 120 $g/m^2$. After the weighed pulp was agitated for 1 minute, the functional composite material 6 was added at a ratio of 30% (based on bone dry pulp), and agitated for 1 minute again, followed by addition of 500 ppm polyacrylamide. After 30 seconds agitation, a sheet was formed on a square sheet former. The sheet was calendered once under a pressure of 0.3 MPa and aged in an oven at 105° C. for 20 minutes. After the sheet was maintained under room temperature to equilibrate the moisture, functional paper having antimicrobial efficacy was obtained.

Comparative Example 6

Addition of Kaolin Instead of the Functional Composite Material 6 in Pulp

Paper was prepared as in Example 15 except that kaolin was added in the pulp.

Antimicrobial behavior was tested for Example 15 and Comparative Example 6 according to GB/T 23763-2009 "Photo-catalytic antimicrobial materials and articles thereof—Assessment for antimicrobial activity and efficacy".

|  | Sterilizing Rate | |
|---|---|---|
|  | Example 15 | Comparative Example 6 |
| Staphylococcus aureus | >99% | 0 |
| Escherichia coli | >99% | 0 |
| Monilia albican | >94% | 0 |

EXAMPLE 16

Use of the Functional Composite Material 7 in Adhesive with Chloroprene Rubber Adhesive as an Example Chloroprene Rubber Adhesive for Construction Use Formulation:

| | |
|---|---|
| Highly viscous non-sulfur modified chloroprene rubber | 100 parts |
| Antioxidant RD (2,2,4-trimethyl-1,2-dihydroquinoline polymer) | 2 parts |
| Functional composite material 7 | 4 parts |
| Magnesium oxide | 6 parts |
| Calcium silicate | 10 parts |
| Tert-butyl phenolic resin | 60 parts |
| Solvent | appropriate amount |

(Solid content is generally 20%-30%, and the solvent is a mixture of 40% toluene, 30% ethyl acetate and 30% gasoline.)

Roll Mill Compounding.

The chloroprene rubber was compounded several times in a blender mill, and then the functional composite material 7, the magnesium oxide and the calcium silicate were mixed into the resultant green rubber to prepare compounded rubber. The resin was dissolved in the solvent, and the compounded rubber was dissolved therein under agitation, then the rest components were added together to prepare homogeneous adhesive.

Comparative Example 7

No Incorporation of the Functional Composite Material 7, but with Addition of Antioxidant and Zinc Oxide Filler in the Formulation Formulation:

| | |
|---|---|
| Highly viscous non-sulfur modified chloroprene rubber | 100 parts |
| Antioxidant RD (2,2,4-trimethyl-1,2-dihydroquinoline polymer) | 2 parts |
| Zinc oxide | 4 parts |
| Magnesium oxide | 6 parts |
| Calcium silicate | 10 parts |
| Tert-butyl phenolic resin | 60 parts |
| Solvent | appropriate amount |

(Solid content is generally 20%-30%, and the solvent is a mixture of 40% toluene, 30% ethyl acetate and 30% gasoline.)

The chloroprene rubber was melted in a blender mill, and then the zinc oxide, the magnesium oxide and the calcium silicate were mixed into the resultant green rubber to prepare compounded rubber. The resin was dissolved in the solvent, and the compounded rubber was dissolved therein under agitation. Then, the rest components were added together to prepare homogeneous adhesive.

Test:

The adhesives in Example 16 and Comparative Example 7 were tested according to GB/T12954-1991 "General testing methods for construction adhesives". Antimicrobial behavior was tested with reference to GB/T21866-2008 "Test method and effect for antibacterial capability of antimicrobial coatings (painting films)". Antifungus behavior was tested with reference to JISZ 2911-1992 "Methods of test for fungus resistance".

| Test Items | Example 16 | Comparative Example 7 |
|---|---|---|
| Tensile adhesive original strength (Mpa) | ≥0.5 | ≥0.5 |
| Tensile adhesive original strength after water soaking (Mpa) | ≥0.5 | ≥0.5 |
| Tensile adhesive original strength after thermal aging (Mpa) | ≥0.5 | ≥0.5 |
| Tensile adhesive original strength after freeze-thaw cycle (Mpa) | ≥0.5 | ≥0.5 |
| Tensile adhesive original strength after standing cool for 20 minutes (Mpa) | ≥0.5 | ≥0.5 |
| Early tensile adhesive original strength (Mpa) | ≥0.5 | ≥0.5 |
| Sterilizing Rate | | |
| *Staphylococcus aureus* | ≥90 | 0 |
| *Escherichia coli* | ≥90 | 0 |
| *Monilia albican* | ≥90 | 0 |
| Antifungus | Level 1 | Level 4 |

This indicates that a functional composite material may be used to substitute inorganic filler to the same amount in an adhesive, which may be imparted with antimicrobial and antifungus efficacies without changing its original properties.

EXAMPLE 17

Use of the Functional Composite Material 6 in Cement (with Cement Mortar as an Example that can be Coated on Mortar Facings of Building Facade and Floor Rendering)

Formulation:

| | |
|---|---|
| Grade 42.5 Portland cement | 94 kg |
| Functional composite material 6 | 10 kg |
| Sand (particle size <0.63 mm) | 290 kg |
| Naphthalene series water reducer (naphthalene sulfonate formaldehyde condensate) | 0.5 kg |
| Ethylene-vinyl acetate copolymer emulsion powder | 4.5 kg |
| Water | 55 kg |

Preparation Process:

The functional composite material 6 and water were dispersed for 30 minutes using a high speed dispersion machine. The resultant dispersion was mixed evenly with the cement, the sand, the naphthalene series water reducer and the ethylene-vinyl acetate copolymer emulsion powder by agitation. The cement mortar thus prepared was coated on a 50 cm×50 cm glass plate and allowed to dry thoroughly.

Comparative Example 8

Without the Functional Composite Material 6

| | |
|---|---|
| Grade 42.5 Portland cement | 94 kg |
| Sand (particle size <0.63 mm) | 290 kg |
| Naphthalene series water reducer (naphthalene sulfonate formaldehyde condensate) | 0.5 kg |
| Ethylene-vinyl acetate copolymer emulsion powder | 4.5 kg |
| Water | 55 kg |

Preparation Process:

The cement, the sand, the naphthalene series water reducer and the ethylene-vinyl acetate copolymer emulsion powder were mixed evenly with by agitation. The comparative cement mortar thus prepared was coated on a 50 cm×50 cm glass plate and allowed to dry thoroughly.

The 24-hour air-purifying behavior was tested for the prepared glass plate samples coated with cement mortar according to GB/T 23761-2009 "Test method of photocatalytic materials for air purification".

| Test Items | Example 17 | Comparative Example 8 |
|---|---|---|
| 24-hour degrading rate of formaldehyde | 78.6% | 35.4% |
| 24-hour degrading rate of toluene | 64.2% | 26.5% |
| 24-hour degrading rate of ammonia | 66.4% | 33.4% |
| 24-hour degrading rate of TVOC | 58.8% | 28.7% |

This indicates that cement mortar containing the functional composite material 6 has good air-purifying behavior. For example, when coated on mortar facings of building facade and floor rendering, it can afford a product that has the function of air purification.

EXAMPLE 18

Use of the Functional Composite Material 4 in Rubber (with Styrene Butadiene Rubber as an Example Formulation:

| Functional composite material 4 | 50 g |
|---|---|
| Styrene butadiene rubber 1500 | 100 g |
| Zinc oxide | 3 g |
| Stearic acid | 1 g |
| Tetramethylthiuram disulfide | 1 g |
| Sulfur | 1.74 g |
| N-cyclohexylthiophthalimide | 0.2 g |
| 4-octyloxybenzophenone | 0.5 g |
| Antioxidant AW | 1 g |

Preparation process: The green styrene butadiene rubber 1500 was compounded in an blender mill in a manner of tight roll grinding and fall-into-pan. The green rubber, the zinc oxide, the Tetramethylthiuram disulfide, the stearic acid, the N-cyclohexylthiophthalimide, 4-octyloxybenzophenone, the antioxidant AW, the functional composite material 4 and the sulfur experienced several thin passes in the mill, and then were discharged evenly in the form of sheet, wherein the compounding time was 12-15 minutes. The positive cure point was determined using a curemeter. Vulcanization was carried out at 153° C. when the positive cure point was achieved. Compression molding was carried out in a vulcanizer to afford a test sheet of rubber/multifunctional composite material.

Comparative Example 9

Without the Functional Composite Material 4, Pure Styrene Butadiene Rubber

The formulation was similar to that in Example 18 except that the functional composite material 4 in Example 18 was removed. Pure styrene butadiene rubber was prepared in the same way.

The mechanical properties of the obtained test rubber sheets were tested according to GB 6037-1985 "Vulcanized rubber—Determination of tensile strength and ultimate elongation at high temperatures", GB/T 528-1998 "Determination of tensile stress-strain properties", GB/T 528-1999 "Determination of tear strength" and GB/T 7755-1987 "Vulcanized rubber—Determination of gas permeability", and the results were shown below.

| Test Items | Example 18 | Comparative Example 9 |
|---|---|---|
| Ultimate elongation | 756% | 200% |
| Tensile strength | 17.6 Mpa | 1.6 Mpa |
| 300% specified elongation | 4.68 Mpa | 1.34 Mpa |
| 500% specified elongation | 7.46 Mpa | 1.89 Mpa |
| Tear strength | 39 KN/m | 5.5 KN/m |
| Gas permeability | $28.56 \times 10^{-18}$ m$^2$/Pa · s | $59.18 \times 10^{-18}$ m$^2$/Pa · s |

This indicates that incorporation of the functional composite material 4 in styrene butadiene rubber may improve the mechanical properties of the rubber significantly, and provide some function of gas blocking as shown by the decrease of the gas permeability of Example 18 by 48% in comparison with pure styrene butadiene rubber.

EXAMPLE 19

Use of the Multifunctional Composite Material 8 in Ceramic Glaze

Taking sanitary ceramic as an example, the surface of the green ceramic body was glazed twice.

Substrate Glaze Formulation: Zirconium Opaque Glaze

| Components | Content (wt %) |
|---|---|
| Zirconium powder | 12 |
| Dolomite | 5 |
| Calcite | 12 |
| Potassium feldspar | 26 |
| Zinc oxide | 5 |
| Functional composite material 8 | 4 |
| Quartz | 31 |
| Strontium carbonate | 2 |
| Transparent frit | 2 |

Cover Glaze Formulation:

| Components | Content (wt %)) |
|---|---|
| Quartz | 10 |
| Potassium feldspar | 9 |
| Functional composite material 8 | 4 |
| Transparent frit | 70 |
| Zinc oxide | 7 |

Preparation Process:

After the ceramic paste surface was glazed twice by spraying, the ceramic was sintered in a furnace, wherein it was heated steadily to 300° C. in 1.5 hours, held for 1.5 hours, further heated at an even pace to 600° C. in 1.5 hours, held for 1.5 hours, still further heated at an even pace to 900° C., held for 1.5 hours, yet still further heated at an even pace to 1200° C. in 2 hours, and held for 2 hours. Then, the heat source was cut off to allow the ceramic to cool naturally, and antimicrobial sanitary ceramic was thus obtained.

Comparative Example 10

The preparation process was substantially the same as in Example 19, except that white Su clay (kaolin produced in Suzhou) was used to substitute the functional composite material 8 completely.

Relevant antimicrobial test was carried out for the sanitary ceramic products obtained in Example 19 and Comparative Example 10 according to JC/T897-2002 "Antibacterial function of antibacterial ceramic", and the results were shown below:

| Test Items | Sterilizing Rate of Example 19 | Sterilizing Rate of Comparative Example 10 |
|---|---|---|
| *Staphylococcus aureus* | 96.3% | 42% |
| *Escherichia coli* | 97.8% | 34% |
| *Monilia albican* | 92.2% | 24% |

This indicates that incorporation of a functional composite material in ceramic may afford a functional sanitary ceramic article with antimicrobial efficacy.

All publications mentioned in the invention are incorporated herein by reference, as if each of them were specifically and individually incorporated herein by reference. In addition, it is to be understood that various changes or modifications may be made to the invention by those skilled in the art after reading the above teachings of the invention. These equivalent variations fall in the scope defined by the accompanied claims.

The invention claimed is:

1. A composite material, comprising an inorganic nonmetallic mineral as a support and a nanotitania layer loaded on the support, wherein the nanotitania layer is comprised of a plurality of titania nanospheres, the titania nanosphere is comprised of a plurality of nanotitania single particles, the diameter of the nanotitania single particle is in the range of 1-20 nm, and the diameter of the titania nanosphere is 2-100 times that of the nanotitania single particle.

2. The composite material of claim 1, wherein the composite material further comprises one or more functional layers loaded on the nanotitania layer.

3. The composite material of claim 1, wherein the inorganic nonmetallic mineral used as the support is acid resistant.

4. The composite material of claim 3, wherein the inorganic nonmetallic mineral used as the support is one or more material(s) selected from the group consisting of kaolin, mica, talc powder, barium sulfate, diatomite, bentonite, montmorillonite, white carbon black, wollastonite, zeolite, sepiolite, attapulgite, and magnetite.

5. The composite material of claim 1, wherein the inorganic nonmetallic mineral used as the support has a particle size that is in the range of 0.2-100 μm.

6. The composite material of claim 5, wherein the particle size of the inorganic nonmetallic mineral used as the support is in the range of 1-40 μm.

7. The composite material of claim 1, wherein the diameter of the nanotitania single particle is in the range of 2-10 nm, and the diameter of the titania nanosphere is 5-50 times that of the nanotitania single particle.

8. The composite material of claim 1, wherein the loading amount of the nanotitania layer is 1-50% by weight of the inorganic nonmetallic mineral support layer.

9. The composite material of claim 8, wherein the loading amount of the nanotitania layer is 5-30% by weight of the inorganic nonmetallic mineral support layer.

10. The composite material of claim 9, wherein the loading amount of the nanotitania layer is 5-20% by weight of the inorganic nonmetallic mineral support layer.

11. The composite material of claim 2, wherein the loading amount of the functional layer is 0.1-20% by weight of the inorganic nonmetallic mineral support layer.

12. The composite material of claim 1, wherein the nanotitania layer is loaded firmly onto the inorganic nonmetallic mineral support.

13. The composite material of claim 12, wherein the load firmness of the nanotitania layer on the inorganic nonmetallic mineral support may be verified by using the following procedure:
 a 5% suspension of 1 g of said composite material in 20 g ethanol is prepared, dispersed for 4 hours using a high speed dispersing homogenizer at 10000 rpm, then diluted with ethanol to 0.05% in concentration;
 0.02 ml of the diluted suspension is sampled and examined using a transmission electron microscope, an area in which distinct particles are concentrated while distributed evenly is selected to take TEM images at 5000× and 20000× magnifications respectively, which show that no free titania nanosphere is observed after the composite material has been dispersed using the high speed dispersing homogenizer.

14. The composite material of claim 2, wherein the functional layer is selected from the group consisting of UV shielding protective layer, flame resistant layer, photocatalytic enhancing layer, antimicrobial layer and photocatalytic-antimicrobial enhancing layer.

15. The composite material of claim 14, wherein the UV shielding protective layer comprises one or more oxides selected from the group consisting of silica, hydrated silica, alumina, hydrated alumina and zirconia.

16. The composite material of claim 14, wherein the flame resistant layer comprises magnesium hydroxide.

17. The composite material of claim 14, wherein the photocatalytic enhancing layer comprises zinc oxide.

18. The composite material of claim 14, wherein the antimicrobial layer comprises silver salt.

19. The composite material of claim 14, wherein the photocatalytic-antimicrobial enhancing layer comprises zinc oxide and silver salt.

20. A method for preparing a composite material, wherein the method comprises the following steps:
 preparing a dispersed suspension of an inorganic nonmetallic mineral used as a support material in the presence of water, an inorganic acid and a first dispersant;
 preparing a hydrolyzed solution of titanium tetrachloride in the presence of water and a second dispersant; and
 mixing the dispersed suspension of the inorganic nonmetallic mineral with the hydrolyzed solution of titanium tetrachloride to allow them to react completely to obtain a composite material that comprises the inorganic nonmetallic mineral as a support and a nanotitania layer loaded on the support, wherein the nanotitania layer is comprised of a plurality of titania nanospheres, the titania nanosphere is comprised of a plurality of nanotitania single particles, the diameter of the nanotitania single particle is in the range of 1-20 nm, and the diameter of the titania nanosphere is 2-100 times that of the nanotitania single particle.

21. The method of claim 20, wherein the method further comprises the following step:
 dispersing the resultant composite material in the presence of water and a first dispersant to obtain a suspension, adding a starting material(s) for preparing a functional layer into the composite material suspension to allow them to react completely to obtain a new functional layer loaded on the composite material.

22. The method of claim 21, wherein the step of loading a functional layer is repeated to prepare a composite material with multiple functional layers.

23. The method of claim 20 or 21, wherein the first dispersant is one or more materials selected from the group consisting of sodium polyacrylate, ammonium polyacrylate, polyacrylamide, alkali metal polyphosphate, polycarboxylic acid, sodium polycarboxylate, sodium dodecylsulfate, sodium dodecylsulfonate, sodium lignosulfonate, ammonium salt dispersant, polyester dispersant and polyether dispersant, and the first dispersant for preparing the dispersed suspension of the inorganic nonmetallic mineral in claim 20 and the first dispersant for dispersing the resultant composite material in claim 21 may be the same or different.

24. The method of claim 20, wherein the second dispersant is one or more material selected from the group consisting of polyacrylamide, polyvinyl alcohol, sodium polyacrylate, ammonium polyacrylate, polycarboxylic acid, sodium polycarboxylate, ammonium salt dispersant, polyester dispersant, polyether dispersant, polyethylene glycol dispersant, polyalkenyl alcohol dispersant, polyimides dispersant and polyurethanes dispersant.

25. The method of claim 20 or 21, wherein the first dispersant(s) and the second dispersant may be the same or different.

26. The method of claim 20, wherein the inorganic nonmetallic mineral suspension prepared in the presence of water, the inorganic acid and the first dispersant is evenly dispersed with a solid content of 4-50 wt%; the inorganic acid accounts for 2.5-35 wt% of the suspension; and the first dispersant accounts for 0.01-10 wt% of the suspension.

27. The method of claim 20, wherein the weight ratio of water and titanium tetrachloride is (1-10):1, and the weight of the second dispersant is 5-20% of the weight of titanium tetrachloride, for the preparation of the hydrolyzed solution of titanium tetrachloride in the presence of water and the second dispersant.

28. The method of claim 20, wherein the mixing ratio of the inorganic nonmetallic mineral suspension and the hydrolyzed solution of titanium tetrachloride is such that the weight of titanium tetrachloride is 2-60% of the weight of the inorganic nonmetallic mineral.

29. The method of claim 20, wherein the inorganic acid is a strong inorganic acid.

30. The method of claim 29, wherein the inorganic acid is selected from sulfuric acid, hydrochloric acid, and nitric acid, or a mixture of two or more of these acids.

31. A composition, comprising a composite material, the composite material comprising an inorganic nonmetallic mineral as a support and a nanotitania layer loaded on the support, wherein the nanotitania layer is comprised of a plurality of titania nanospheres, and the titania nanosphere is comprised of a plurality of nanotitania single particles.

32. The composition of claim 31, wherein the composite material further comprises one or more functional layers loaded on the nanotitania layer.

33. The composition of claim 31 or 32, wherein the composition is one useful in coatings, cosmetics, paper making, binders, water treatment, plastics, rubbers, fibers, ceramics, adhesives or cements.

34. A method for using a composite material, comprising:
using a composite material as an additive;
wherein the composite material comprises an inorganic nonmetallic mineral as a support and a nanotitania layer loaded on the support, wherein the nanotitania layer is comprised of a plurality of titania nanospheres, the titania nanosphere is comprised of a plurality of nanotitania single particles, the diameter of the nanotitania single particle is in the range of 1-20 nm, and the diameter of the titania nanosphere is 2-100 times that of the nanotitania single particle.

35. The method of claim 34, wherein the composite material further comprises one or more functional layers loaded on the nanotitania layer.

36. The method of claim 34 or 35, wherein the using the composite material as an additive comprises using the composite material as an additive in one of the fields of paper making, plastics, coatings, fibers, cosmetics, rubbers, ceramics, adhesives, cements or water treatment.

\* \* \* \* \*